(12) United States Patent
Morikawa (10) Patent No.: US 6,404,986 B1
(45) Date of Patent: *Jun. 11, 2002

(54) FOCUS DETECTING DEVICE AND APPARATUS HAVING THE SAME

(75) Inventor: Goichi Morikawa, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 31 days.

(21) Appl. No.: 09/520,233

(22) Filed: Mar. 7, 2000

(30) Foreign Application Priority Data

Mar. 10, 1999 (JP) .......................................... 11-062551

(51) Int. Cl.[7] .............................................. G03B 13/36
(52) U.S. Cl. ............................ 396/50; 396/80; 396/123
(58) Field of Search ............................. 396/50, 80, 82, 396/122, 123, 121

(56) References Cited

U.S. PATENT DOCUMENTS

| | | | |
|---|---|---|---|
| 4,943,824 A | * 7/1990 | Nabeshima et al. | 396/122 X |
| 5,258,801 A | 11/1993 | Kusaka et al. | 354/402 |
| 5,486,892 A | 1/1996 | Suzuki et al. | 354/402 |
| 5,615,398 A | 3/1997 | Matsuyama | 396/77 |
| 5,784,655 A | 7/1998 | Akashi et al. | 396/128 |
| RE36,895 E | * 10/2000 | Tsuru et al. | 396/50 |
| 6,219,492 B1 | * 4/2001 | Maehama et al. | 396/50 |

* cited by examiner

*Primary Examiner*—W. B. Perkey
(74) *Attorney, Agent, or Firm*—Robin, Blecker & Daley (57) ABSTRACT

A focus detecting device includes a defocus amount detecting circuit for detecting an amount of defocus obtained at each of a plurality of focus areas disposed within an image plane, a selecting circuit for, on the basis of amounts of defocus detected respectively at the plurality of focus areas, dividing the plurality of focus areas into a plurality of groups and selecting a focus area capturing a target object from among the plurality of groups, a posture sensor for detecting a posture of an apparatus, a weighting circuit for, on the basis of positions of the plurality of focus areas within the image plane, dividing the plurality of focus areas into a plurality of groups and respectively weighting the plurality of groups, the weighting circuit making grouping of the plurality of focus areas differently according to the posture of the apparatus, and a deciding circuit for deciding at least one focus area from among the plurality of focus areas by adding a result of weighting made by the weighting circuit to a result of selection made by the selecting circuit.

6 Claims, 12 Drawing Sheets

FOCUS DETECTING DEVICE AND APPARATUS HAVING THE SAME

BACKGROUND OF THE INVENTION

1. Field of the Invention

The present invention relates to a focus detecting device having a plurality of focus areas within an image plane or an apparatus having the focus detecting device.

2. Description of Related Art

Some of known focus detecting devices are arranged to split the exit pupil of a photo-taking lens by an optical system of a focus detecting system, to receive two object images formed by light fluxes passing through the split pupil areas on an array of photoelectric conversion elements, such as a CCD sensor array, to detect the focusing state of the photo-taking lens from the output of the photoelectric conversion element array, and to drive the photo-taking lens on the basis of the result of detection.

Figure 12:
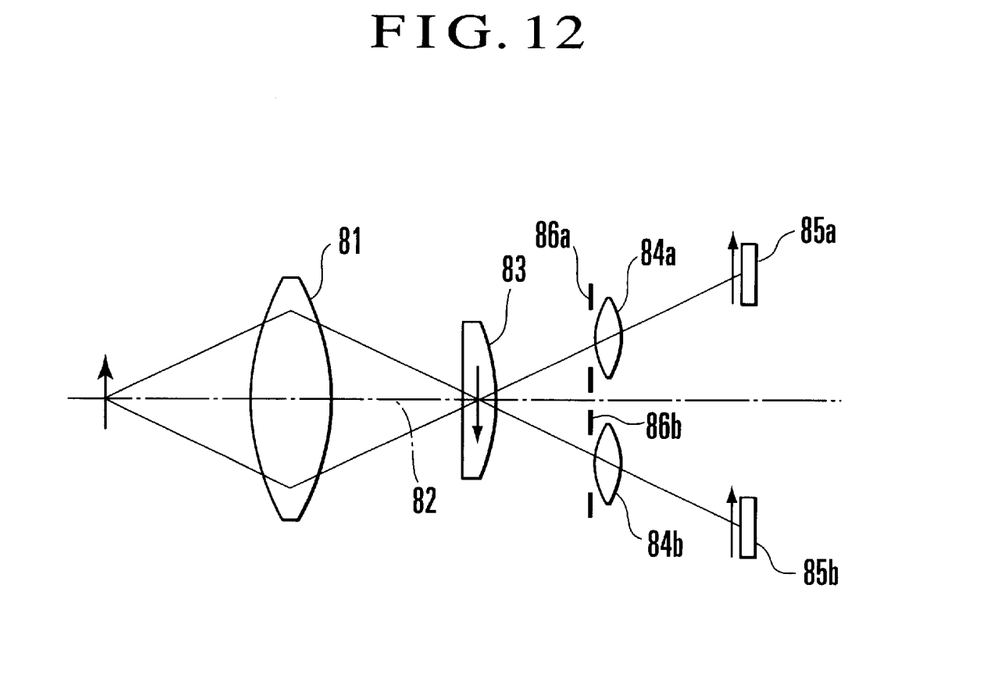
FIG. 12 is a diagram for explaining the optical system of an ordinary focus detecting device of the secondary image forming type.

The basic concept of focus detection which has been known as shown in FIG. 12 is briefly described below.

Referring to FIG. 12, a field lens 83 is set on the optical axis of a photo-taking lens 81 the focus of which is to be detected. Two secondary image forming lenses 84a and 84b are disposed in rear of the field lens 83 at positions symmetrical with respect to the optical axis. Photoelectric conversion element arrays 85a and 85b are disposed further in rear of the secondary image forming lenses 84a and 84b. Diaphragms 86a and 86b are set respectively in the neighborhood of the secondary image forming lenses 84a and 84b. The field lens 83 is arranged to approximately image the exit pupil of the photo-taking lens 81 on the pupil planes of the two secondary image forming lenses 84a and 84b. As a result, light fluxes incident respectively on the secondary image forming lenses 84a and 84b come to make their exits from areas of equal sizes which correspond respectively to the secondary image forming lenses 84a and 84b on the exit pupil plane of the photo-taking lens 81 and never overlap each other.

Space images formed in the neighborhood of the field lens 83 are reimaged by the secondary image forming lenses 84a and 84b on the surfaces of the photoelectric conversion element arrays 85a and 85b. The two images on the photoelectric conversion element arrays 85a and 85b change their positions according to changes of image position in the air in the direction of the optical axis. Therefore, the focusing state of the photo-taking lens 81 can be found by detecting the amount of displacement (deviation) taking place in the relative positions of the two images on the photoelectric conversion element arrays 85a and 85b.

A method for processing photoelectrically-converted image signals outputted from the photoelectric conversion element arrays 85a and 85b is well known. Therefore, the details of this method are omitted from the description given here. In brief, an arithmetic operation is performed on some correlative functions while electrically (virtually) shifting the image signals.

With the displacement of the relative positions obtained in this manner, the amount of focus deviation, i.e., the so-called amount of defocus, of the photo-taking lens is detected.

According to the above-stated defocus-amount detecting method, a pair of sensors are arranged to extract only the luminance distribution of a specific area of an object space. It is, therefore, impossible to compute the amount of defocus for any object that has no luminance distribution within that specific area.

To solve this problem, a method was disclosed in Japanese Patent Publication No. SHO 59-28886 and Japanese Laid-Open Patent Application No. SHO 62-212611. This method permits focus detection for a greater number of objects by arranging a plurality of sensor pairs and focus detecting optical systems corresponding thereto and by extracting luminance distributions obtained within a plurality of object areas.

In the case of this method, small areas for which focus is detectable are called focus-detection points. Then, a plurality of focus-detection points are arranged within a viewfinder field to correspond to many objects.

Figure 13:
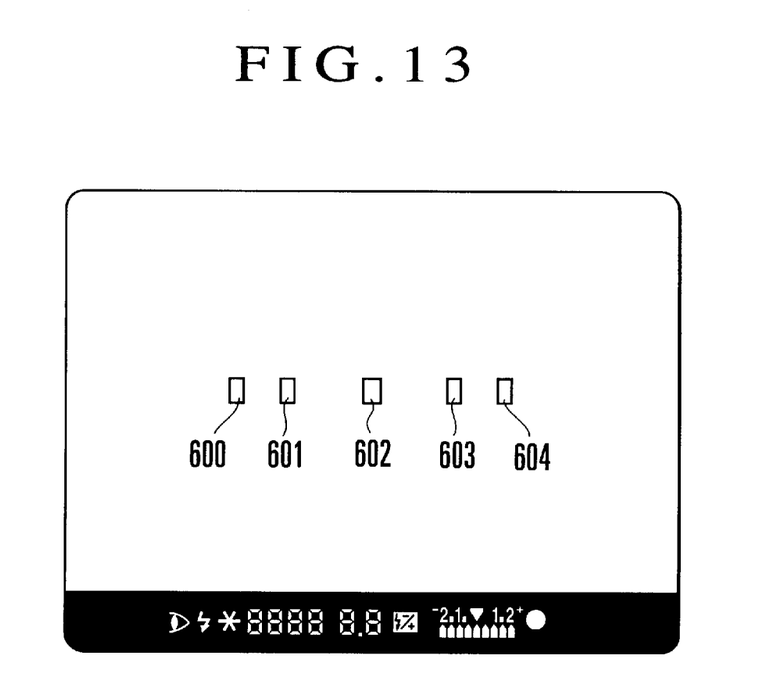
FIG. 13 is a diagram showing, by way of example, a viewfinder field of a conventional camera.

For example, the focus-detection points to be used for focus detection are arranged horizontally as indicated by reference numerals 600 to 604 in FIG. 13. As regards a method for finally obtaining an amount of defocus from a plurality of focus detecting mechanisms which correspond to these focus-detection points, a near-point priority algorithm in which weight is attached to a central focus-detection point is well known.

Figure 14:
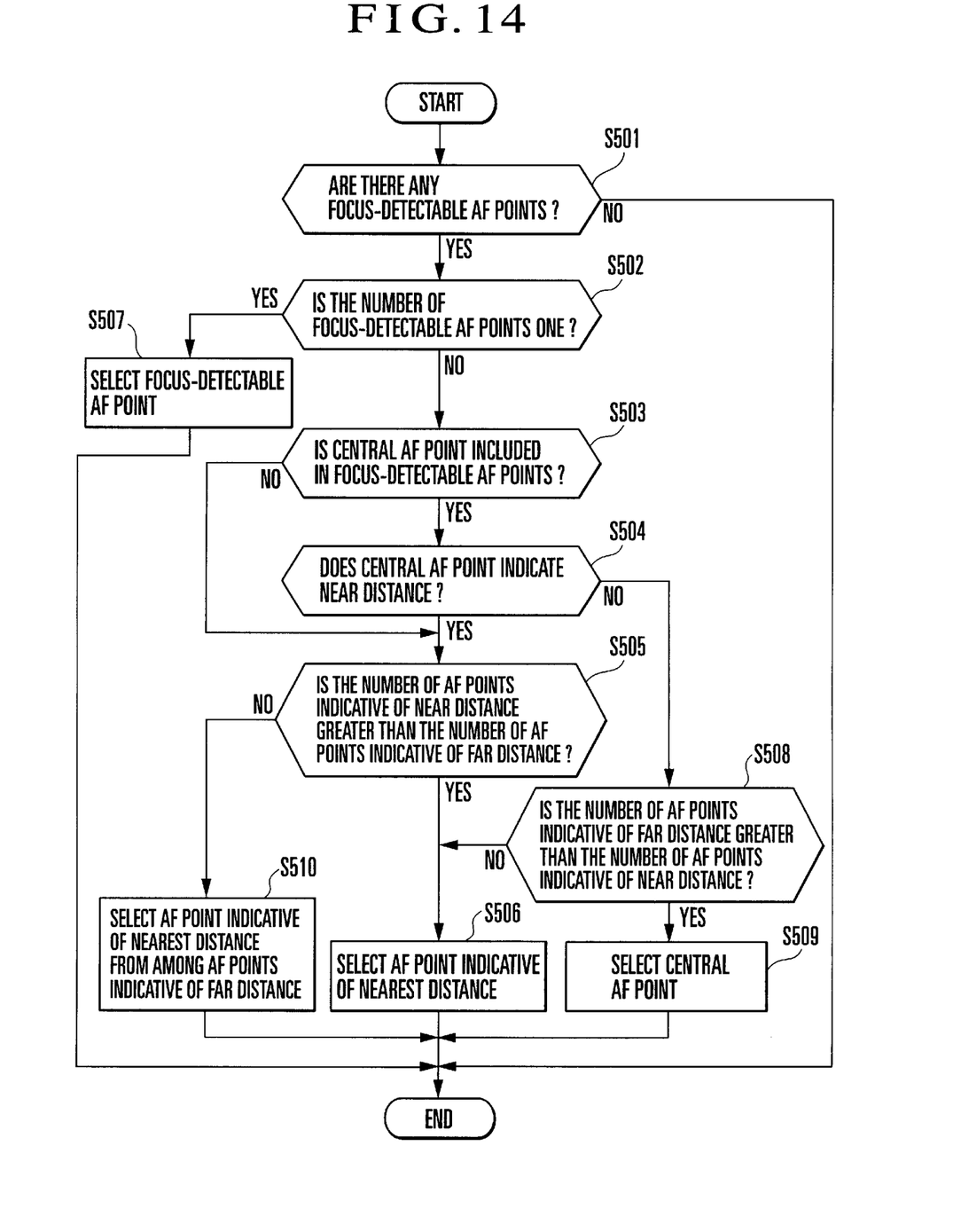
FIG. 14 is a flow chart showing a conventional focus-detection point automatic selecting algorithm.

FIG. 14 is a flow chart showing an automatic focus-detection point selection algorithm in which weight is attached to a central focus-detection point. In the flow chart of FIG. 14, the focus-detection points are indicated as AF points. The automatic focus-detection point selection algorithm is carried out as follows.

At a step S501, a check is made for any focus-detection point in which focus is detectable (focus-detectable focus-detection point) among the five focus-detection points. If there is no focus-detectable focus-detection point, the flow of operation comes to an end and returns to a main routine which is not shown. If there is any focus-detectable focus-detection point, the flow proceeds from the step S501 to a step S502. At the step S502, a check is made to find if the number of focus-detectable focus-detection points is one. If so, the flow proceeds to a step S507. If not, the flow proceeds to a step S503. At the step S507, the one focus-detectable focus-detection point is selected for obtaining an amount of defocus.

At the step S503, with the number of focus-detectable focus-detection points found at the step S502 to be not one but two or more, a check is made to find if the focus-detectable focus-detection points include a central focus-detection point. If not, the flow directly proceeds to a step S505. If so, the flow proceeds to a step S504. At the step S504, a check is made to find if focus information obtained at the central focus-detection point indicates a near distance. If so, the flow proceeds to the step S505.

In other words, the flow of operation proceeds to the step S505 either if the central focus-detection point is a focus-detectable focus-detection point and indicates a near distance or if the central focus-detection point is not a focus-detectable focus-detection point. At the step S505, a check is made to find if the number of focus-detectable focus-detection points indicative of near distances is larger than the number of focus-detectable focus-detection points indicative of far distances. If so, the flow proceeds to a step S506 on the assumption that a main object of shooting is located at a near distance. If not, the flow proceeds to a step S510 on the assumption that the main object is located at a far distance. At the step S506, a focus-detectable focus-detection point indicative of the nearest distance is selected for obtaining an amount of defocus. At the step S510, taking the depth of field into consideration, a focus-detectable focus-detection point indicative of the nearest distance among focus-detectable focus-detection points indicative of far distances is selected for obtaining an amount of defocus.

Further, if the focus information obtained at the central focus-detection point at the step S504 indicates a far distance, the flow proceeds from the step S504 to a step S508. At the step S508, a check is made to find if the number of focus-detectable focus-detection points indicative of far distances is larger than the number of focus-detectable focus-detection points indicative of near distances. If so, the flow proceeds to a step S509, on the assumption that the main object of shooting is located at a far distance including the central focus-detection point, and the central focus-detection point is selected for obtaining an amount of defocus. If not, the flow proceeds to the step S506 to select the focus-detection point indicative of the nearest distance for obtaining an amount of defocus.

According to the prior art described above, if some of focus-detection points are found to permit focus detection, one of the focus-detectable focus-detection points is automatically selected as a focus-detection point to be used for obtaining an amount of defocus.

BRIEF SUMMARY OF THE INVENTION

In accordance with one aspect of the invention, there is provided a focus detecting device for deciding at least one focus area from among a plurality of focus areas disposed within an image plane, the focus detecting device comprising selecting means for, on the basis of amounts of defocus detected respectively at the plurality of focus areas, dividing the plurality of focus areas into a plurality of groups and selecting a focus area capturing a target object from among the plurality of groups, weighting means for, on the basis of positions of the plurality of focus areas within the image plane, dividing the plurality of focus areas into a plurality of groups and respectively weighting the plurality of groups, and deciding means for deciding at least one focus area from among the plurality of focus areas by adding a result of weighting made by the weighting means to a result of selection made by the selecting means, the weighting means performing the grouping and the weighting differently according to a posture of an apparatus. Accordingly, it is possible to decide an optimum focus area from among the plurality of focus areas irrespective of the posture of the apparatus.

The above and other aspects and features of the invention will become apparent from the following detailed description of a preferred embodiment thereof taken in connection with the accompanying drawings.

DETAILED DESCRIPTION OF THE INVENTION

Hereinafter, a preferred embodiment of the invention will be described in detail with reference to the drawings.

Figure 1:
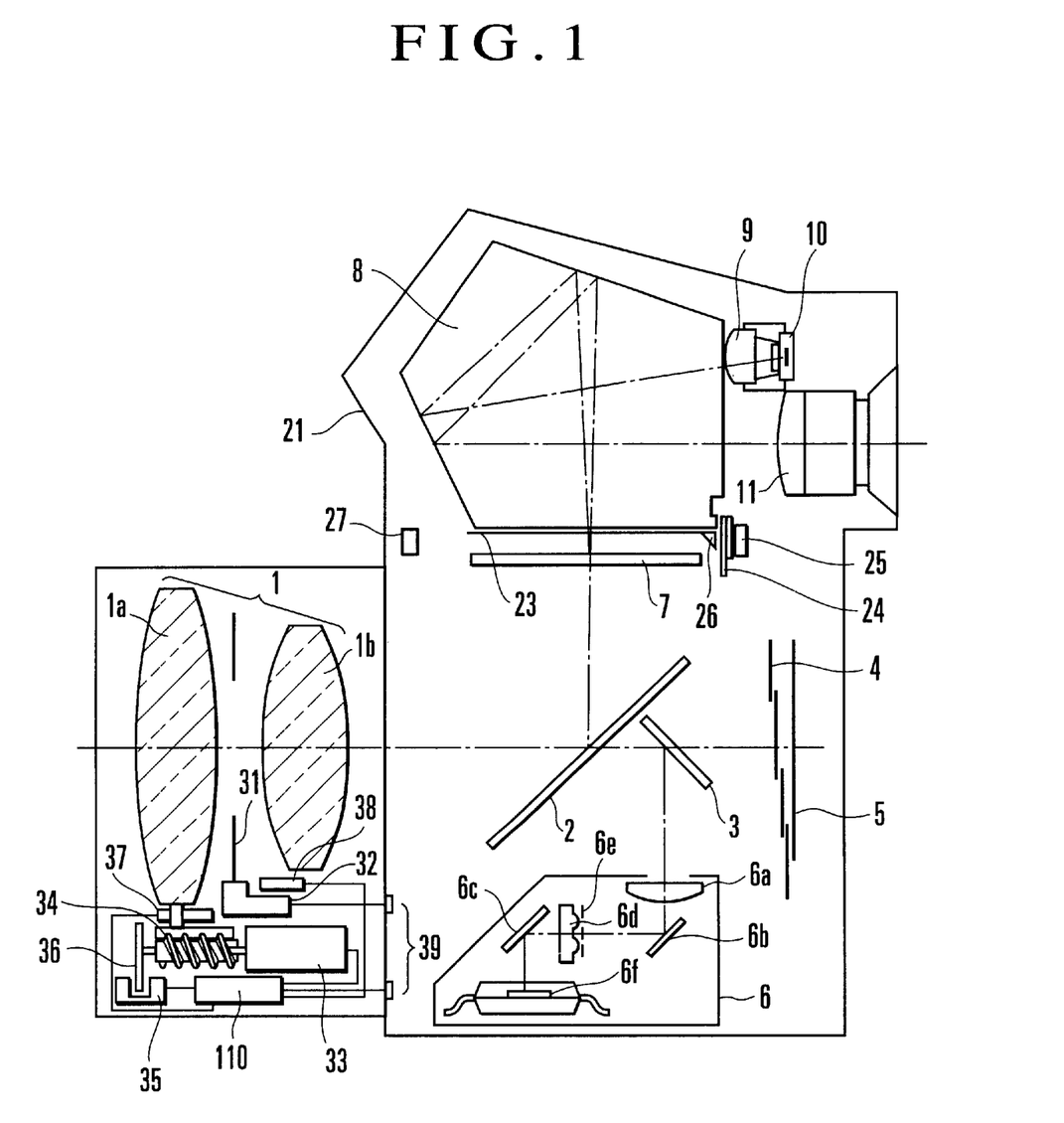
FIG. 1 is a diagram showing the optical layout of a single-lens reflex camera to which the invention is applied.
Figure 2:
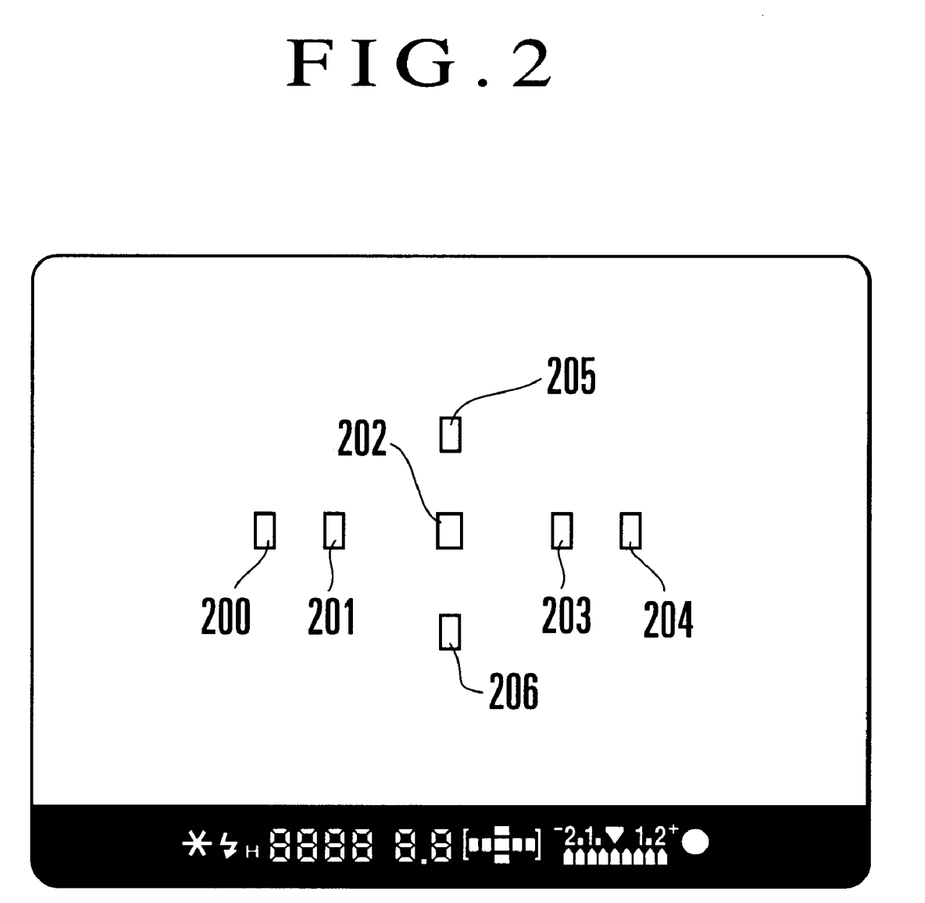
FIG. 2 is a diagram showing the arrangement of focus-detection points within the viewfinder of the single-lens reflex camera shown in FIG. 1.

FIGS. 1 to 9 relate to the embodiment of the invention. FIG. 1 is a diagram showing the optical layout of a single-lens reflex camera having a focus detecting device according to the embodiment of the invention. FIG. 2 is a diagram showing the arrangement of focus-detection points within a viewfinder.

Referring to FIG. 1, a photo-taking lens 1 is shown, for the sake of expediency, as having two lenses 1a and 1b. In actuality, however, the photo-taking lens 1 is composed of a number of lenses. A main mirror 2 is arranged to be obliquely set in a photo-taking optical path for photo-taking or moved to a retracted position for observing images. A submirror 3 is arranged to reflect a light flux passing through the main mirror 2 toward the lower part of a camera body. The camera has a shutter 4 and a photosensitive member 5 which is a silver-halide film, a solid-state image sensor, such as a CCD or MOS, or a camera tube such as a vidicon or the like.

A focus detecting device 6 is of a known phase-difference type and includes a field lens 6a which is disposed in the neighborhood of an image forming plane, reflection mirrors 6b and 6c, a secondary image forming lens 6d, a diaphragm 6e, and a line sensor 6f which is an image-signal accumulating type sensor, such as a CCD or the like, consisting of a plurality of photoelectric conversion element arrays. As shown in FIG. 2, the focus detecting device is arranged according to the invention to be capable of detecting focus at each of a total of seven focus-detection points, including five focus-detection points 200 to 204 which are horizontally aligned and two focus-detection points 205 and 206 which are vertically aligned in addition to the horizontal alignment.

A focusing screen 7 is set on a prescribed image forming plane of the photo-taking lens 1. A pentagonal prism 8 is arranged to change a viewfinder optical path. An image forming lens 9 and a light measuring sensor 10 are arranged in combination to measure the luminance of the object of shooting obtained within an observation image plane. The image forming lens 9 is arranged to set the focusing screen 7 and the light measuring sensor 10 in a conjugate relation to each other. An eyepiece lens 11 is arranged in rear of the exit side of the pentagonal prism 8 to enlarge the visual field of the viewfinder.

A viewfinder optical system is formed by the main mirror 2, the focusing screen 7, the pentagonal prism 8 and the eyepiece lens 11.

A field mask 23 is arranged to define the field area of the viewfinder. An intraviewfinder LCD 24 is provided for displaying photo-taking information outside of the viewfinder field. The intraviewfinder LCD 24 is illuminated with an illumination LED (F-LED) 25. A light passing through the intraviewfinder LCD 24 is led into the viewfinder by a triangle prism 26 to make a display outside of the viewfinder field, as shown in FIG. 2. This display enables the user of the camera to know photo-taking information of varied kinds. A posture sensor 27 is arranged to detect whether the camera is in a vertical posture or a horizontal posture. In the case of the vertical posture, the posture sensor 27 is capable of making a discrimination between a skyward or earthward posture of a release button 41 of the camera.

A diaphragm 31 is disposed inside of the photo-taking lens 1. A diaphragm driving device 32 includes a diaphragm driving circuit 111. A motor 33 is provided for driving the photo-taking lens 1. A lens driving member 34 is composed of a driving gear, etc. A photo-coupler 35 is arranged to detect the rotation of a pulse plate 36 which is interlocked with the lens driving member 34 and to send information on the rotation of the pulse plate 36 to a focus adjusting circuit 110. The focus adjusting circuit 110 is arranged to cause the lens driving motor 33 to drive the photo-taking lens 1 to a predetermined extent on the basis of this information and information on a lens driving amount coming from the camera body. The lens driving motor 33 is thus caused to move the photo-taking lens 1 to its in-focus position.

A distance information code plate 37 is provided for obtaining information on a distance from the camera to an object of shooting by detecting the position of the photo-taking lens 1. The distance information code plate 37 has a code pattern arranged, for example, to indicate distance positions from a nearest distance position to an infinitely distant position with 4 bits or thereabout. The distance information code plate 37 is thus arranged to be capable of detecting an object distance obtained at an in-focus position by using a brush contact which is not shown. A focal length information code plate 38 is provided for detecting the focal length of the photo-taking lens 1. The focal length information code plate 38 is arranged to be capable of detecting a focal length corresponding to the zooming movement of the photo-taking lens 1 by using a brush contact which is not shown. Both the code plates 37 and 38 are connected to the focus adjusting circuit 110. Mount contacts 39 are arranged in a known manner as an interface between the camera body and the photo-taking lens 1.

Figure 3A:
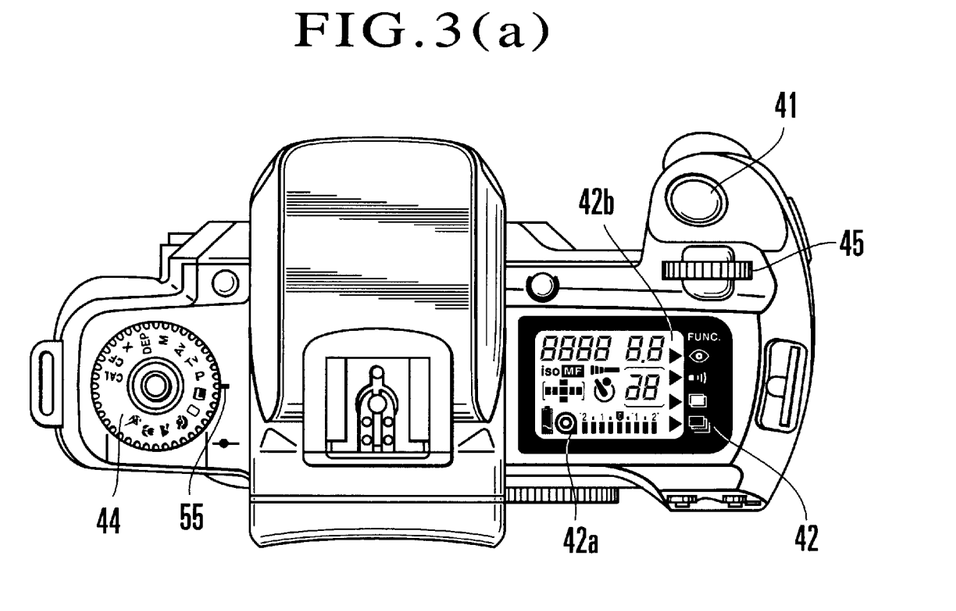
FIGS. 3(a) and 3(b) are appearance views showing the upper side and the rear side of the single-lens reflex camera shown in FIG. 1, respectively.
Figure 3B:
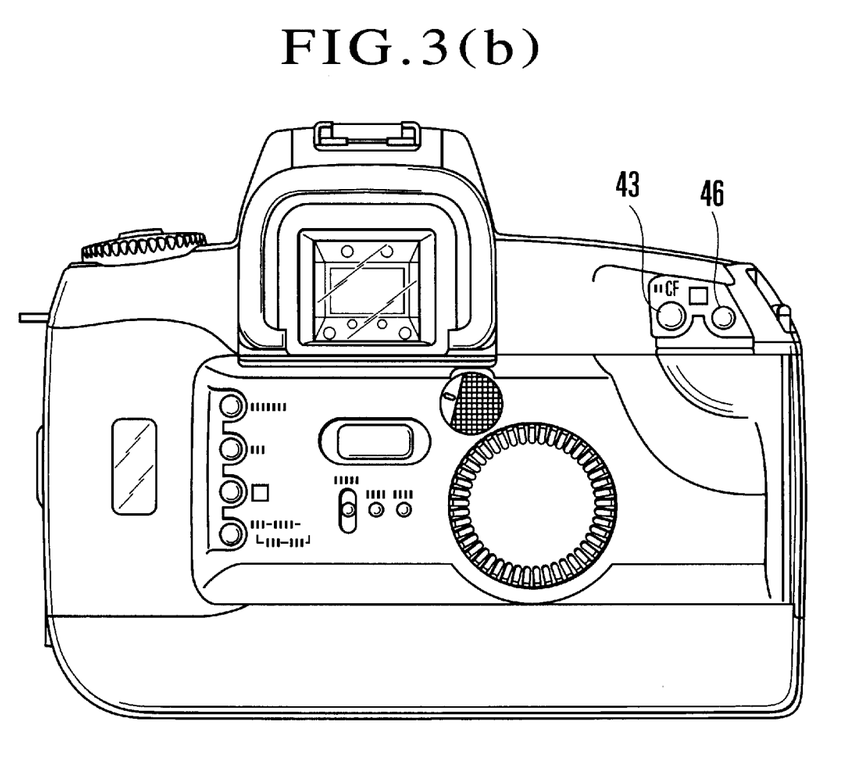

FIGS. 3(a) and 3(b) show the upper and rear sides of the above-stated single-lens reflex camera. Referring to FIGS. 3(a) and 3(b), the camera has the release button 41. A monitor LCD 42 is an external monitor display device and is composed of a fixed segment display part 42a which displays a predetermined pattern and a 7-segment display part 42b which displays variable numerical values. A mode dial 44 is provided for selecting a photo-taking mode or the like. A rotary electronic dial 45 is provided for setting various setting values in combination with other operation members and modes. A focus-detection point selection button 46 is provided for selecting one of the plurality of focus-detection points 200 to 206 within the image plane for focus detection. The action of the focus-detection point selection button 46 will be described in detail later herein. The details of other operation members shown in FIGS. 3(a) and 3(b) are omitted from the following description because they are not particularly related to the invention.

Figure 4:
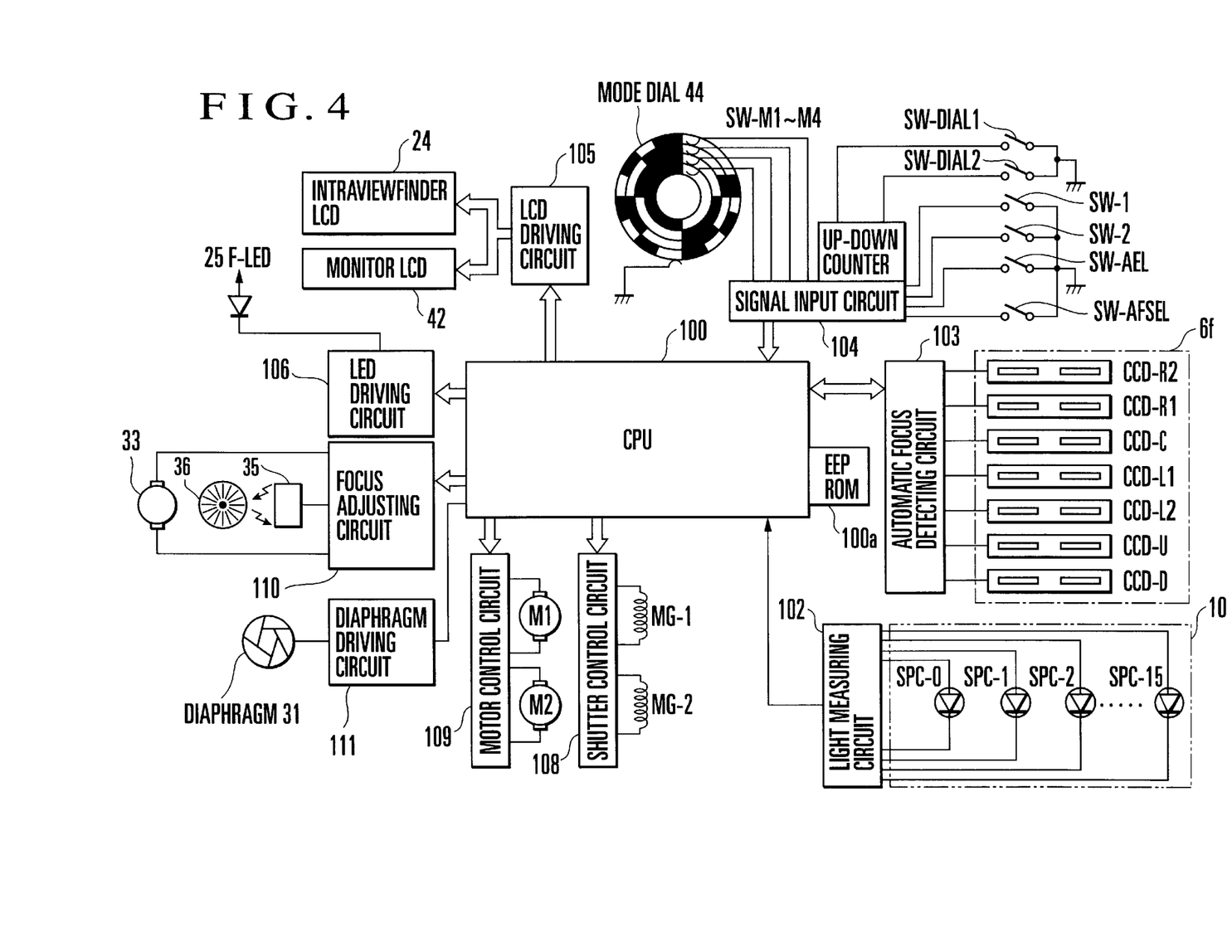
FIG. 4 is a block diagram showing the circuit arrangement of the single-lens reflex camera shown in FIG. 1.

FIG. 4 is a block diagram showing the electric arrangement of parts incorporated in the single-lens reflex camera arranged as described above. In FIG. 4, all parts that are the same as those shown in FIG. 1, etc., are indicated by the same reference numerals as used in FIG. 1, etc.

Referring to FIG. 4, to a central processing unit (hereinafter referred to as the CPU) 100 of a microcomputer which is disposed within the camera body, there are connected a light measuring circuit 102, an automatic focus detecting circuit 103, a signal input circuit 104, an LCD driving circuit 105, an LED driving circuit 106, a shutter control circuit 108 and a motor control circuit 109. The CPU 100 is arranged to transmit signals through the mount contacts 39 (shown in FIG. 1) to the focus adjusting circuit 110 and the diaphragm driving circuit 111 which are disposed within the photo-taking lens 1. An EEPROM 100a accompanying the CPU 100 serves as a storage means for storing information arbitrarily set by the user.

The light measuring circuit 102 is arranged to A/D-convert, with logarithmic compression, a signal from the light measuring sensor 10, after amplifying the signal, and to send the signal of each part of the light measuring sensor 10 to the CPU 100 as luminance information. The line sensor 6f is composed of seven pairs of line sensors CCD-L2, CCD-L1, CCD-C, CCD-R1, CCD-R2, CCD-U and CCD-D which correspond to the seven focus-detection points 200 to 206 of the image plane shown in FIG. 2. The line sensor 6f is arranged in a known manner.

A switch SW-1 is arranged to be turned on by the first stroke of the release button 41 and to cause a light measuring action, an AF action, etc., to begin. A switch SW-2 is a release switch arranged to be turned on by the second stroke of the release button 41. A switch SW-AEL is arranged to turn on when an AE lock button 43 is pushed. A switch SW-AFSEL is arranged to turn on when the focus-detection point selection button 46 is pushed.

Figure 5A:
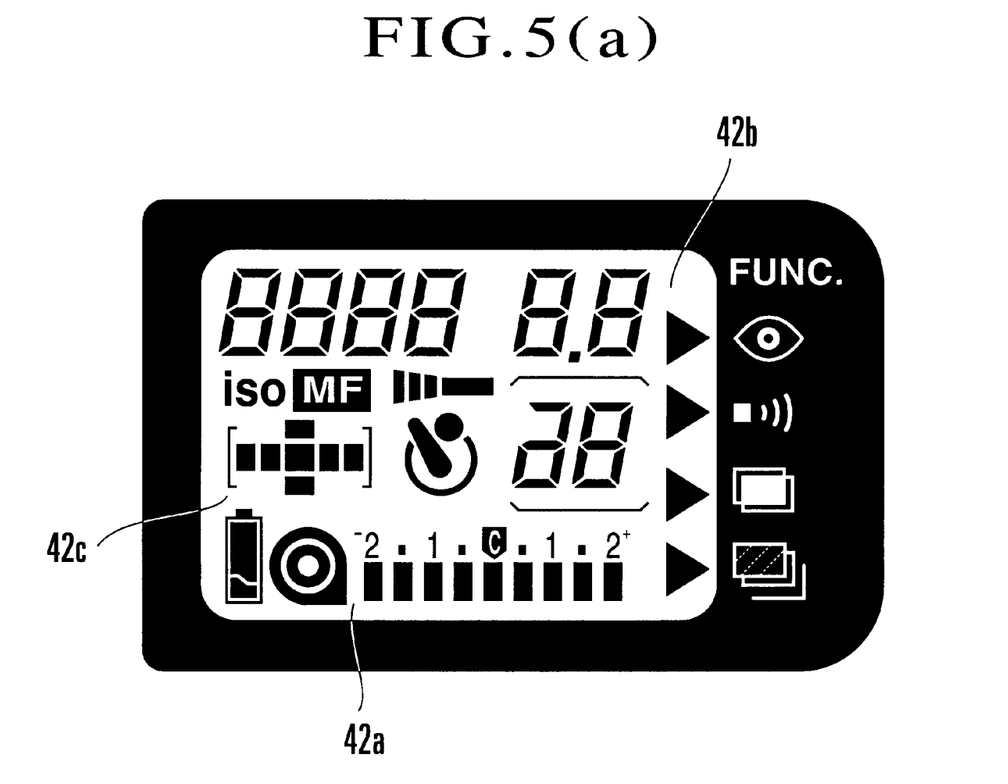
FIGS. 5(a) and 5(b) are diagrams showing all segments of a monitor LCD shown in FIG. 3(a) and all segments of an intraviewfinder LCD, respectively.
Figure 5B:
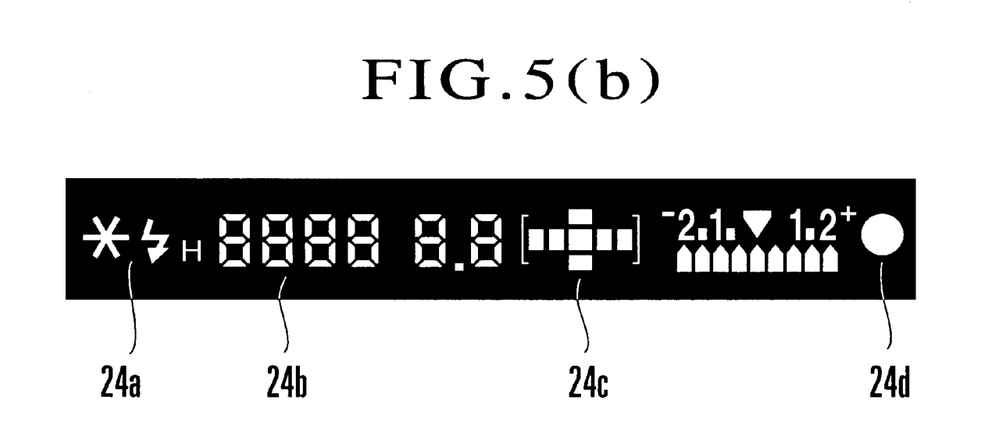

FIG. 5(a) shows in detail all display segments of the monitor LCD 42 shown in FIG. 3(a). FIG. 5(b) shows in detail all display segments of the LCD 24 disposed within the viewfinder.

Referring to FIG. 5(a), the fixed segment display part 42a is arranged to display in a known manner a photo-taking mode. The seven-segment display part 42b for a variable numerical value display is composed of a four-digit seven-segment part arranged to display a shutter time value, a two-digit seven-segment part and a decimal point part arranged to display an aperture value, and a limited-value display segment part and a one-digit seven-segment part arranged to display the number of film frames. The monitor LCD 42 further includes a selected focus-detection point display part 42c which corresponds to the focus-detection points 200 to 206 shown in FIG. 2. The selected focus-detection point display part 42c will be described in detail later as this part represents a feature of the present embodiment.

Referring to FIG. 5(b), a fixed segment display part 24a is arranged in a known manner to display a photo-taking mode. A variable numerical value display part 24b is arranged to make a display which is equivalent in part to the above-stated seven-segment display part 42b. A selected focus-detection point display part 24c is arranged to make a display in the same manner as the display part 42c as will be further described later. An in-focus confirmation display part 24d is arranged to light up when an in-focus state is detected at one of the focus-detection points.

The following describes, with reference to FIGS. 6(a) to 6(h), how a focus-detection point is selected from among the plurality of focus-detection points for an actual focus adjustment action on the photo-taking lens.

FIGS. 6(a) to 6(h) show the display states of the selected focus-detection point display part 42c. The selected focus-detection point display part 24c of the LCD 24 within the viewfinder also shows the same display states. The display states of the display part 42c (24c) vary as described below.

Figure 6A:
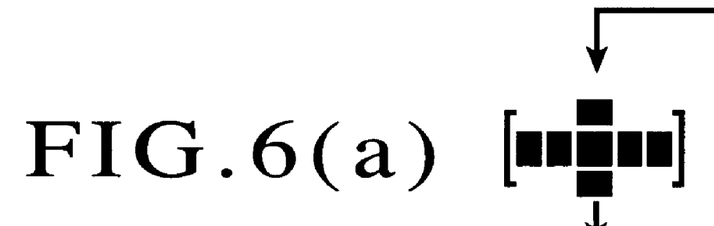
FIGS. 6(a) to 6(h) are diagrams for explaining the display states of a part of the monitor LCD shown in FIG. 3(a).
Figure 6B:
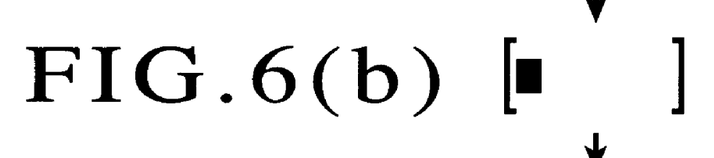
Figure 6C:
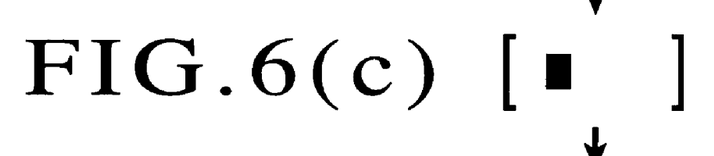
Figure 6D:
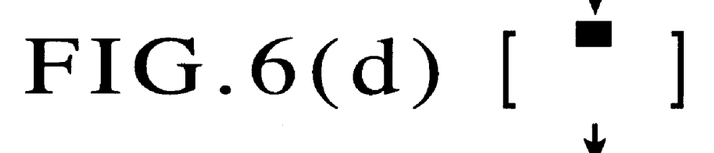
Figure 6E:
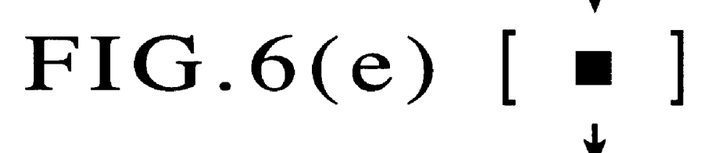
Figure 6F:
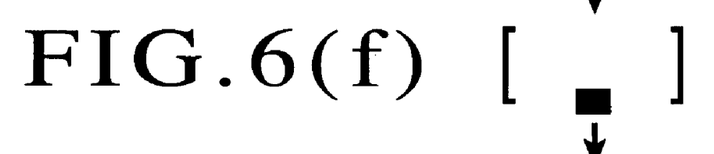
Figure 6G:
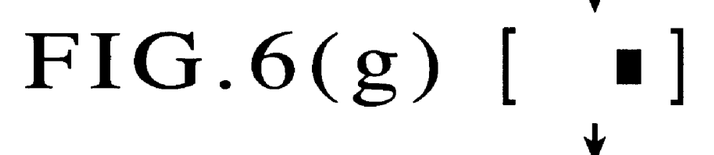
Figure 6H:
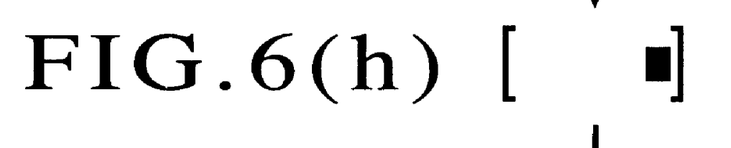

Referring to FIGS. 6(a) to 6(h), every time the electronic dial 45 is turned clockwise to the extent of one click while pushing the focus-detection point selection button 46 at the same time, the display state shown in FIG. 6(a) changes in a cycle to the states shown in FIGS. 6(b) to 6(h) one by one as follows: FIG. 6(a)→FIG. 6(b)→ . . . →FIG. 6(h). Then, one more click of the dial rotation after arrival at the state of FIG. 6(h) brings the display back to the state of FIG. 6(a) for another cycle. When the electronic dial 45 is turned counterclockwise, the cycle of changes of display indicated by arrows in FIGS. 6(a) to 6(h) is reversed.

When the operation on the camera shifts to some other operation member while the display state is as shown in FIG. 6(a), the camera automatically selects one of the seven focus-detection points 200 to 206 at which the focus adjustment action is to be performed on the photo-taking lens 1. This is called a focus-detection point automatic selecting mode. An automatic selection algorithm to be carried out in the focus-detection point automatic selecting mode represents the characteristic feature of the present embodiment. Therefore, the automatic selection algorithm will be described in detail hereinafter.

FIGS. 6(b) to 6(h) show how the display state varies in a focus-detection point manual selection mode which is provided for allowing the user to limit beforehand the use of a focus-detection point for adjusting the focus of the photo-taking lens to one of the seven focus-detection points. The use of the focus-detection point is limited, for example, to the focus-detection point 200 in the case of the display state of FIG. 6(b) and to the focus-detection point 201 in the display state of FIG. 6(c).

In the focus-detection point manual selection mode, since the selectable focus-detection point is limited to one focus-detection point, the length of time required in detecting a focused state becomes shorter to permit an increase in focusing speed. Besides, in a case where the object of shooting is in a certain fixed positional relation to the viewfinder field, the focus-detection point manual selection mode enables the user to have the photo-taking lens accurately focused on a desired object.

However, since only one focus-detection point is usable for focus detection in the focus-detection point manual selection mode, the main (desired) object would easily come outside of the focus-detection point when the object happens to move or the composition of picture is changed a little. In that event, focus detection would become impossible. Another shortcoming of the focus-detection point manual selection mode lies in that the manual selection of the focus-detection point requires time. A shutter-operating opportunity might be missed for the length of time required.

The problems with the focus-detection point manual selection mode can be solved by a focus-detection point automatic selection mode in which one of the seven focus-detection points is automatically selected according to the conditions of a photo-taking scene.

Figure 7:
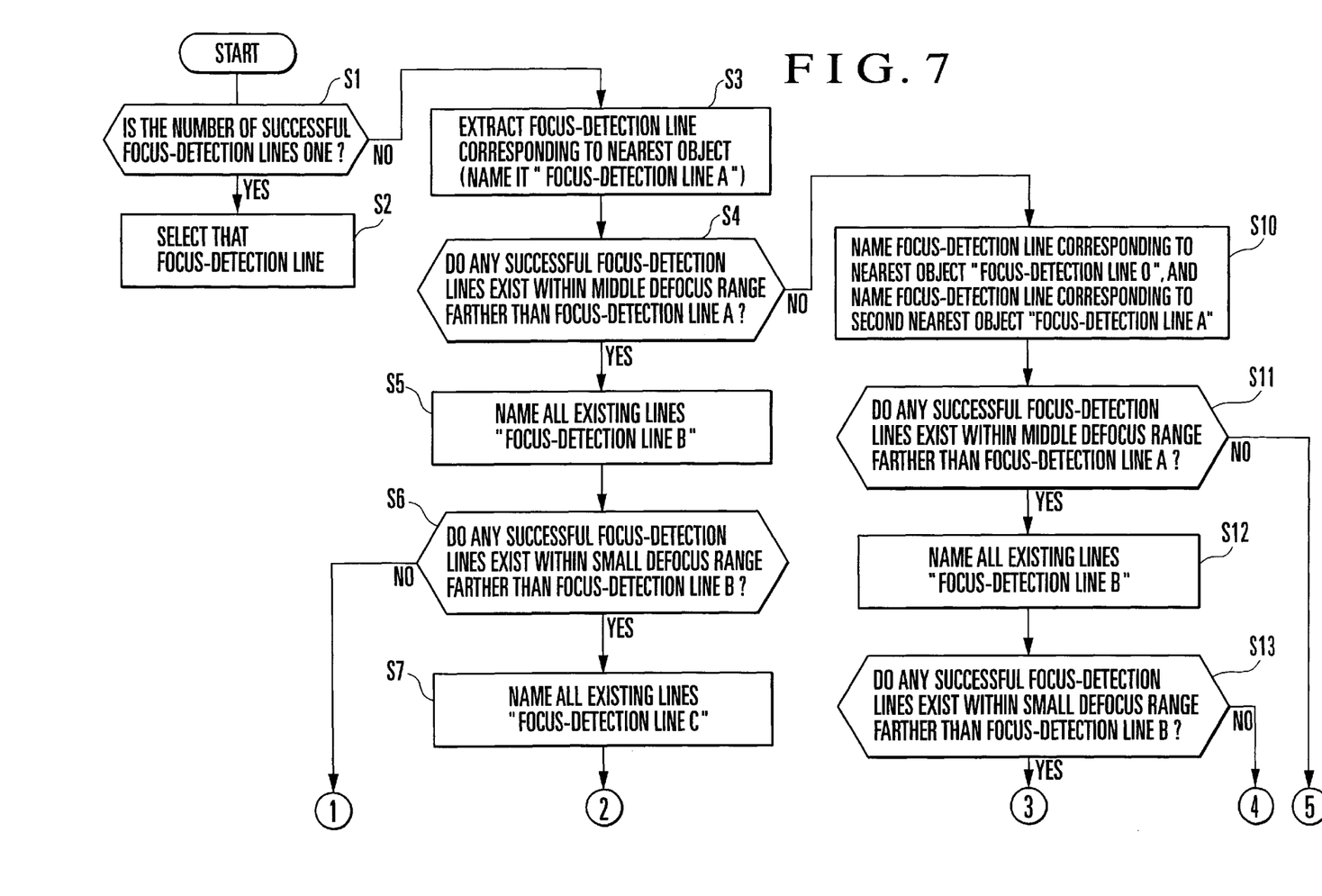
FIG. 7 is a flow chart showing in part a focus-detection point automatic selecting algorithm to be carried out by the single-lens reflex camera shown in FIG. 1.
Figure 8:
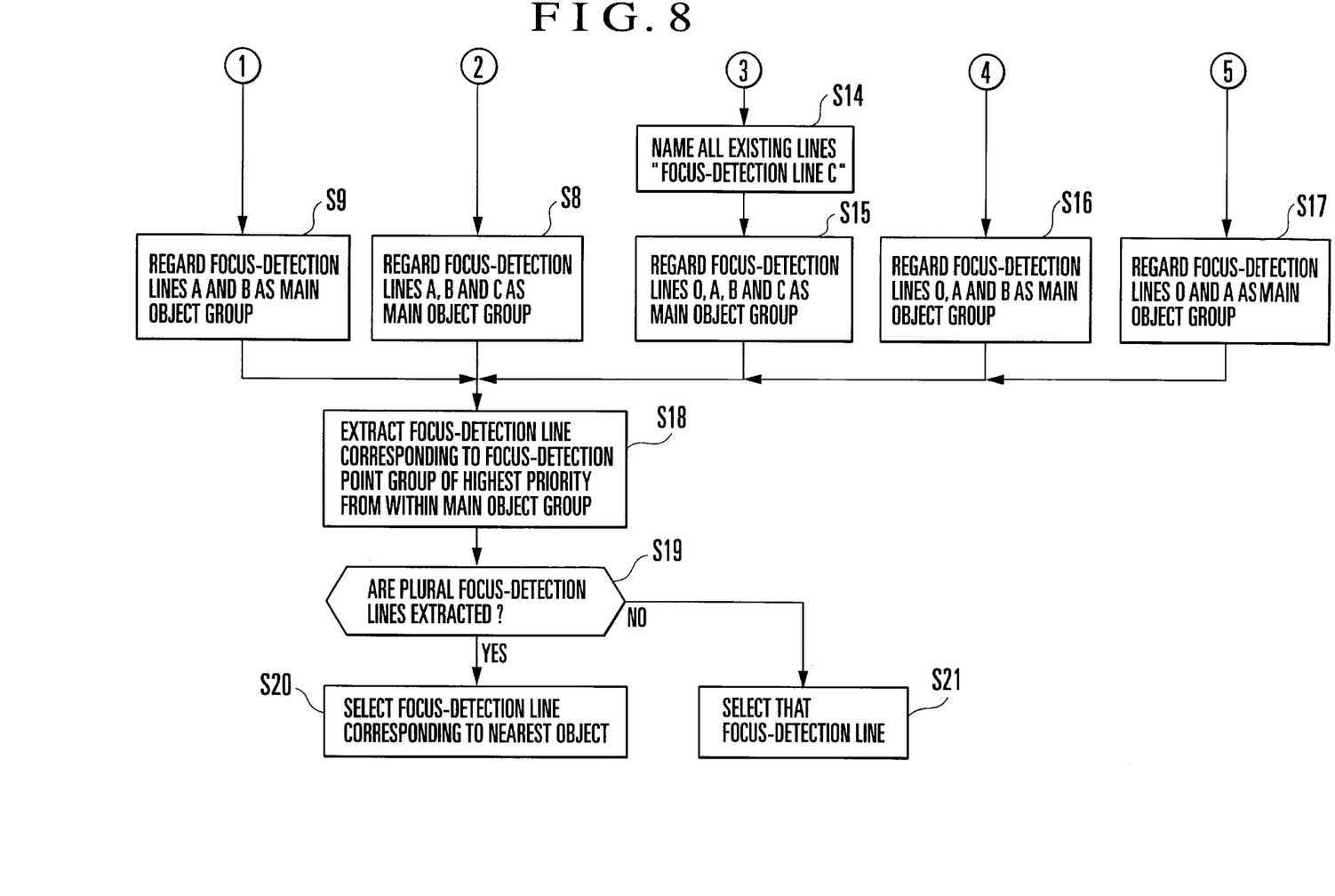
FIG. 8 is a flow chart showing another part of the flow of operation continuing from FIG. 7.

FIGS. 7 and 8 are flow charts showing an automatic selection algorithm to be carried out when the focus-detection point automatic selection mode is set as shown by the display state of FIG. 6(a).

The automatic selection algorithm is allowed to begin when the switch SW-1 is turned on by the first stroke of the release button 41 with the camera held by the user for taking a picture of an object of shooting.

In the flow charts, a term "focus-detection line" means a line sensor composed of the array of photoelectric conversion elements in the focus detecting optical system corresponding to each of the focus-detection points. The actual focus detection is made through the output of this line sensor. Therefore, the flow of the automatic selection algorithm is described below on the basis of the seven line sensors which correspond to the above-stated focus-detection points.

When the switch SW-1 is turned on, the focus detection is performed by the seven line sensors. Then, luminance distributions obtained within the areas of the object which correspond respectively to the focus-detection points are extracted. In a case where there is no luminance distribution at any of the object areas, the output of the line sensor (hereinafter sometimes referred to as the line) for that area becomes an error. Then, the number of focus-detection lines having succeeded in extracting the luminance distributions, i.e., having succeeded in focus detection, (hereinafter referred to as the successful focus-detection lines) is counted.

Under these conditions, at a step S1 of FIG. 7, a check is made to find if the number of successful focus-detection lines is only one while the outputs of other six focus-detection lines become errors. If so, the flow proceeds from the step S1 to a step S2. At the step S2, the focus-detection point corresponding to this successful focus-detection line is decided to be used for focus detection in carrying out a focus adjustment action on the photo-taking lens.

If a plurality of focus-detection lines are found at the step S1 to have succeeded in focus detection, the flow proceeds from the step S1 to a step S3. At the step S3, a focus-detection line which is found, through the amounts of defocus detected, to have captured an object located at the nearest distance from the camera among the plurality of successful focus-detection lines is named "focus-detection line A". At the next step S4, a check is made to find if there is any successful focus-detection line that detects an object located within a middle defocus range farther than the object detected by the focus-detection line A.

The term "middle defocus range" means an amount of defocus which is obtained in the neighborhood of the prescribed image forming plane 5 and is "a" (mm), as reduced to an amount of focus deviation in the direction of the optical axis. In other words, with the focal length of the photo-taking lens 1 assumed to be "f" (mm) and a distance from the prescribed image forming plane 5 to an object located nearest to the camera assumed to be "L" (mm), the middle defocus range aims at grouping all objects located within a range of "$\{(L-f)^2/f^2\} \times a$ (mm)" farther than the object nearest to the camera. In the case of the present embodiment, the amount of defocus "a" is 2 mm. For example, with the photo-taking lens 1 of a focal length 50 mm is mounted on the camera, if the object nearest to the camera is located at a distance of 2.55 m from the prescribed image forming plane, objects located within a range of 5 m on the farther side of this position are grouped together.

If any successful focus-detection line is found to be within the middle defocus range, the flow proceeds from the step S4 to a step S5. At the step 5, all of such focus-detection lines are named "focus-detection line B". At the next step S6, a check is made to find if there is any successful focus-detection line within a small defocus range which is farther away from the focus-detection line capturing an object farthest from the camera among the focus-detection lines included in the focus-detection line B. The term "small defocus range" as used here means an amount of defocus which is obtained in the neighborhood of the prescribed image forming plane 5 and is "b" (mm), as reduced to an amount of focus deviation in the direction of the optical axis. The value of "b" is smaller than the value of "a". If any successful focus-detection line is found at the step S6 to be within the small defocus range, the flow proceeds to a step S7 to name it "focus-detection line C". In other words, with objects of shooting found to be existing within the middle defocus range farther than the object nearest to the camera, the range of grouping the focus-detection lines is broadened a little. In the present embodiment, the value of "b" is set at 0.2 mm. With the focus-detection line C found, the flow proceeds from the step S7 to a step S8 (FIG. 8). At the step S8, the focus-detection lines A, B and C are regarded as a main object group.

If no successful focus-detection line is found at the step S6 to exist within the small defocus range, i.e., if no focus-detection line C is found, the flow proceeds to a step S9 (FIG. 8). At the step S9, the focus-detection lines A and B are regarded as a main object group.

Further, if no successful focus-detection line is found at the step S4 to exist within the middle defocus range, the flow proceeds from the step S4 to a step S10. At the step S10, the focus-detection line A is renamed "focus-detection line O", and a successful focus-detection line which captures an object located second nearest to the camera is considered to be the focus-detection line A. At the next step S11, as in the step S4, a check is made to find if there is any successful focus-detection line that detects an object located within the middle defocus range, which is farther than the object detected by the focus-detection line A. If so, the flow proceeds from the step S11 to a step S12. At the step S12, all such lines are named "focus-detection line B". The flow then proceeds to a step S13.

At the step S13, a check is made, as in the step S6, to find if there is any successful focus-detection line for an object located within the small defocus range which is farther away from the focus-detection line capturing an object farthest from the camera among the focus-detection lines included in the focus-detection line B. If so, the flow proceeds from the step S13 to a step S14 (FIG. 8). At the step S14, all such lines are named "focus-detection line C". At the next step S15, the focus-detection lines O, A, B and C are regarded as a main object group. If no successful focus-detection line is found at the step S13 to exist within the small defocus range, the flow proceeds from the step S13 to a step S16 (FIG. 8). At the step S16, the focus-detection lines O, A and B are regarded as a main object group.

If no successful focus-detection line is found at the step S11 to exist within the middle defocus range, the flow proceeds from the step S11 to a step S17 (FIG. 8). At the step S17, the focus-detection lines O and A are regarded as a main object group.

As described above, the main object group is decided on the basis of an object located nearest to the camera.

The grades of priority to be given to the focus-detection points are described below referring to FIGS. 9 to 11.

Figure 9:
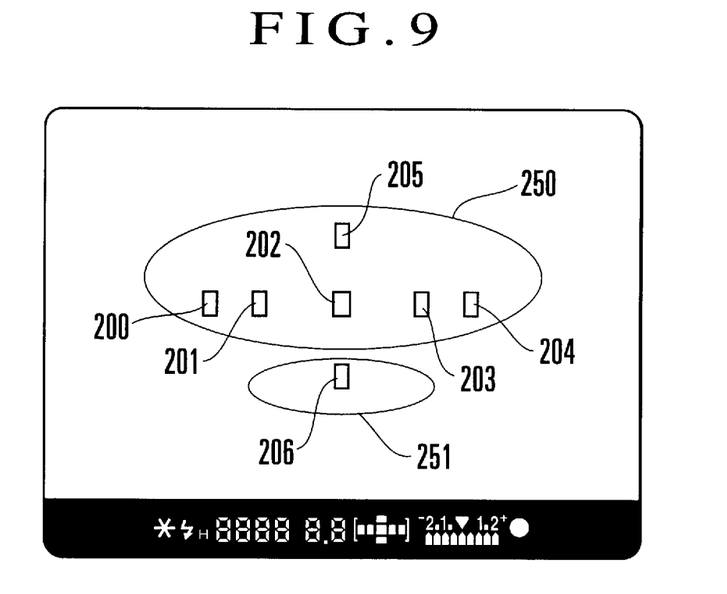
FIG. 9 is a diagram for explaining a first example of dividing of focus-detection points into groups.

FIG. 9 shows a case where the camera is found by the posture sensor 27 shown in FIG. 1 to be held in a horizontal posture by the user.

In this case, of the seven focus-detection points 200 to 206, the focus-detection points 200 to 205 which are located in upper parts when the camera is in the horizontal posture is named "focus-detection point group 250". The remaining focus-detection point 206 is named "focus-detection point group 251". Then, "priority grade 1" is given to the focus-detection point group 250, and "priority grade 2" is given to the focus-detection point group 251.

Figure 10:
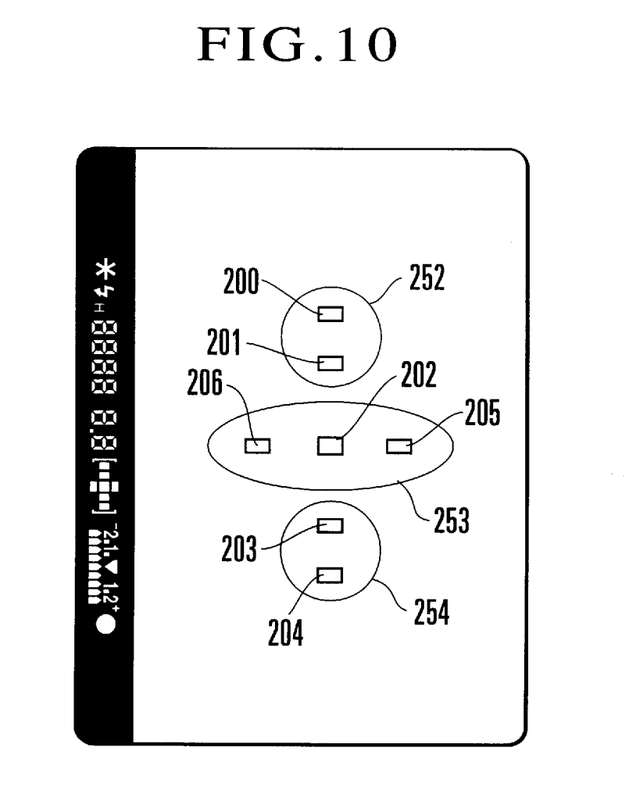
FIG. 10 is a diagram for explaining a second example of dividing of focus-detection points into groups.

FIG. 10 shows a case where the camera is found by the posture sensor 27 to be held in a vertical posture having the release button 41 on the side of the earth.

In this case, a group including the focus-detection points 200 and 201 which are at positions on the side of the sky is named "focus-detection point group 252". Then, "priority grade 1" is given to the focus-detection point group 252. Another group including the focus-detection points 202, 205 and 206 is named "focus-detection point group 253". Then, "priority grade 2" is given to the focus-detection point group 253. A further group including the focus-detection points 203 and 204 which are at positions on the side of earth is named "focus-detection point group 254". Then, "priority grade 3" is given to the focus-detection point group 254.

Figure 11:
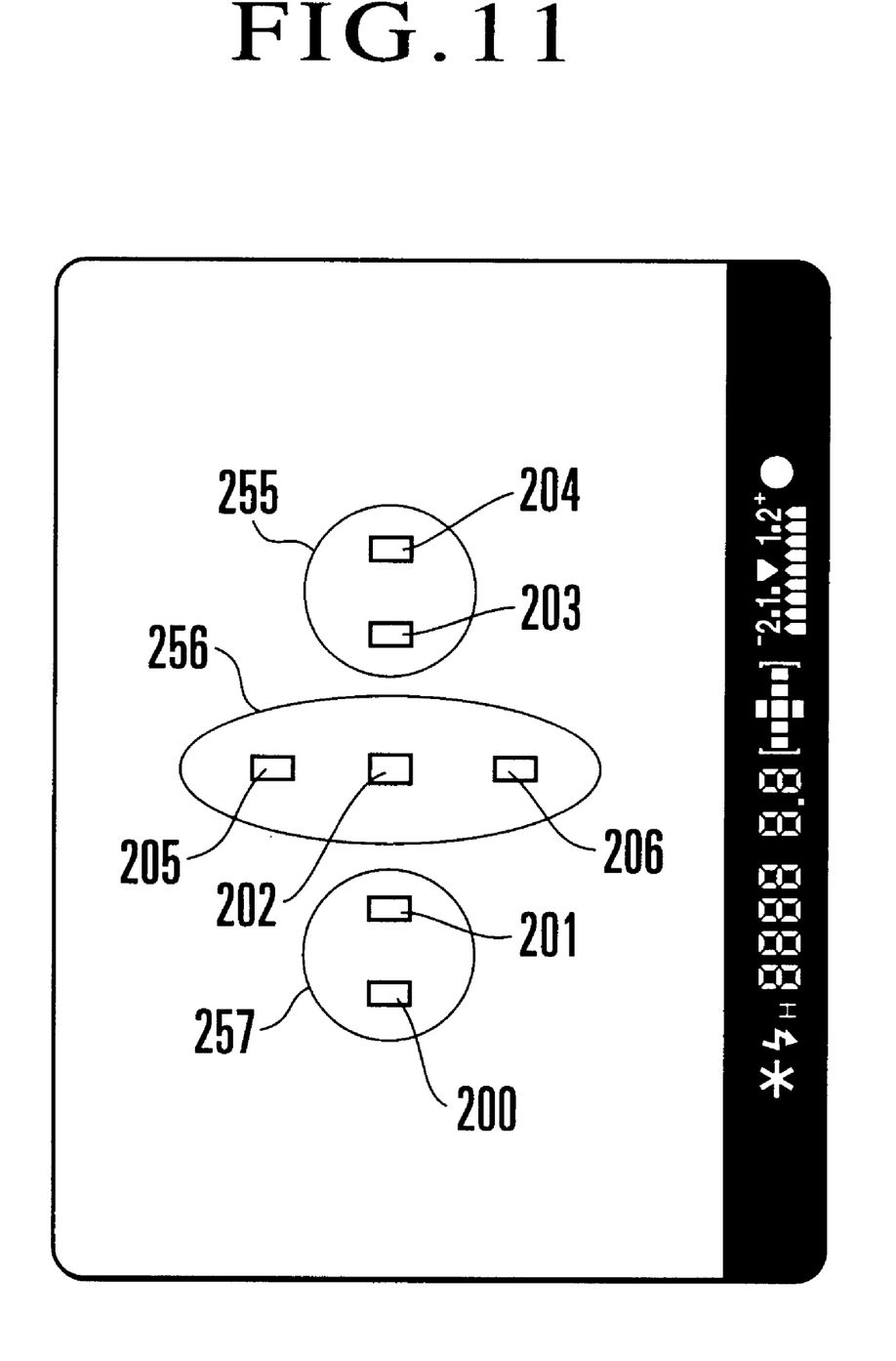
FIG. 11 is a diagram for explaining a third example of dividing of focus-detection points into groups.

FIG. 11 shows another case where the camera is in another vertical posture obtained with the camera turned 180 degrees from the posture of FIG. 10.

In the case of FIG. 11, the focus-detection points 203 and 204 are at positions on the side of the sky, and a group including them is named "focus-detection point group 255". Then, "priority grade 1" is given to the focus-detection point group 255. Another group including the focus-detection points 202, 205 and 206 is named "focus-detection point group 256". Then, "priority grade 2" is given to the focus-detection point group 256. Further, a group including the focus-detection points 200 and 201 which are this time at positions on the side of the earth is named "focus-detection point group 257". Then, "priority grade 3" is given to the focus-detection point group 257.

These grades of priority are allocated by taking into consideration the degree of probability of having the main object of shooting located in each of different positions within the visual field of the viewfinder. The priority grades are allocated, in the order of from the highest grade to the lower grades, to the highest, medium and lowest probabilities of having the main object, as "priority grade 1>priory grade 2>priority grade 3". Therefore, the priory grade 1 is higher than the priority grade 2, and the priority grade 2 is higher than the priory grade 3.

Referring again to FIG. 8, at a step S18, a focus-detection line which corresponds to the focus-detection point group of the highest priority among the focus-detection lines of the main object group is extracted. At the next step S19, a check is made to find if a plurality of focus-detection lines are extracted at the step S18. If not, the flow proceeds from the step S19 to a step S21. If so, the flow proceeds to a step S20. At the step S21, the focus adjusting action on the photo-taking lens is decided to be performed at a focus-detection point which corresponds to the focus-detection line extracted. At the step S20, with the plurality of focus-detection lines found to have been extracted, one of the plurality of focus-detection lines detecting an object located nearest to the camera among objects detected by others is selected. Then, the focus adjusting action on the photo-taking lens is decided to be performed at a focus-detection point corresponding to this focus-detection line.

A focus-detection point at which a main object of shooting is considered to exit is extracted from among the plurality of focus-detection points by the algorithm described above. After that, a focus adjusting action is carried out at the focus-detection point thus extracted.

Photo-taking actions to be carried out after selection of a focus-detection point are well known and, therefore, are omitted from the description given here.

The present embodiment is arranged as described above to have focus-detection points horizontally aligned with some of them vertically aligned, and to extract, from among these focus-detection points, a focus-detection point considered to be capturing a main object of shooting. For this purpose, with an object located nearest to the camera used as a reference object, all objects within a range which is located on the farther distance side of the near object and is variable with the focal length of the photo-taking lens and with a distance to the near object are considered to be one object group. Further, the focus-detection points are grouped according to the posture of the camera and in the order of higher probability of capturing a main object. Priority grades are set and allocated to all of these focus-detection point groups. A focus-detection point considered to be capturing the main object is extracted from among these groups according to the object group and the priority grades allocated to the focus-detection point groups.

In other words, the algorithm for selecting a focus-detection point considered to have a highest probability of capturing a main object is arranged such that, by using amounts of defocus of objects corresponding to the plurality of focus-detection points as parameters, the focus-detection points are grouped on the basis of a focus-detection point capturing an object nearest to the camera, and, according to the posture of the camera, priority grades are allocated to the focus-detection point groups in the order of higher probability of having a main object of shooting. Therefore, with the focus detecting device arranged to have a vertical alignment of focus-detection points in addition to a horizontal alignment of focus-detection points, the focus detecting device enables a camera to accurately capture a main object of shooting.

Further, the algorithm described above obviates the necessity of separately arranging one automatic selecting algorithm for the vertical posture of a camera and another automatic selecting algorithm for the horizontal posture of the camera.

With regard to the priority grade setting action of the present embodiment, the focus-detection point grouping arrangement disclosed may be changed according to the tendency of behavior of the object of shooting. While the value "a" (mm) of the middle defocus range and the value "b" (mm) of the small defocus range are arranged to be fixed values in the case of the present embodiment, the values "a" and "b" may be arranged to be flexibly variable according to the focal length of the photo-taking lens, etc.

While the number of focus-detection points is seven in the case of the present embodiment, this number of course may be variable as desired.

In the case of the embodiment disclosed, the invention is applied to a camera. However, possible applications of the invention are not limited to cameras. The invention is applicable likewise to any other portable apparatuses so long as they are arranged to have a focus detecting function.

Further, the camera which is disclosed by way of example as an embodiment of the invention has a plurality of focus-detection points arranged within the viewfinder. However, the invention likewise applies to a camera of the kind having a plurality of distance measuring points for measuring a distance from the camera to the object of shooting or also to any portable apparatuses that have some other focus detecting functions.

What is claimed is:

1. A focus detecting device mounted in an apparatus, comprising:

a) a focus state detection device which detects a focus state obtained at each of a plurality of focus areas disposed within an image field;

b) a first selection device which selects at least two of the focus areas satisfying a predetermined condition from the focus states detected respectively at the plurality of focus areas by said focus state detection device;

c) a posture detection device which detects a posture of said apparatus;

d) a dividing device which divides the plurality of focus areas into a high priority group having at least one of the focus areas and a low priority group having the other of the focus areas in such a manner that the at least one of the focus areas in the high priority group and the other of the focus areas in the low priority group are different in position-relation from each other according to the posture detected by said posture detector; and e) a second selection device which, when said first selection device selects at least one focus area from the high priority group and selects at least one focus area from the low priority group, selects one of the at least one focus areas from the high priority group.

2. A focus detecting device according to claim 1, wherein said second selection device selects, when said first selection device selects at least two focus areas from the high priority group, one of the at least two focus areas, representing an object located nearest to the apparatus, from the high priority group.

3. A focus detecting device according to claim 1, wherein the predetermined condition is defined by the fact that the apparatus is positioned away from an object located nearest to said apparatus by a predetermined distance with respect to a reference distance from said focus detecting device to the object.

4. A focus detecting device according to claim 1, wherein said apparatus comprises a camera.

5. A focus detecting device according to claim 4, wherein said focus state detection device detects an amount of defocus of a photo-taking lens of the camera.

6. A focus detecting device according to claim 4, wherein the predetermined condition changes according to the focal length of a photo-taking lens of the camera.

* * * * *

UNITED STATES PATENT AND TRADEMARK OFFICE
CERTIFICATE OF CORRECTION

PATENT NO.    : 6,404,986 B1
DATED         : June 11, 2002
INVENTOR(S)   : Goichi Morikawa It is certified that error appears in the above-identified patent and that said Letters Patent is hereby corrected as shown below:

Column 8,
Line 63, delete "At the step 5" and insert -- At the step S5 --.

Signed and Sealed this

Ninth Day of September, 2003

JAMES E. ROGAN
*Director of the United States Patent and Trademark Office*